United States Patent [19]

Masumoto

[11] Patent Number: 4,648,058

[45] Date of Patent: Mar. 3, 1987

[54] LOOK-AHEAD ROUNDING CIRCUIT

[75] Inventor: Rodney T. Masumoto, San Diego, Calif.

[73] Assignee: TRW Inc., Redondo Beach, Calif.

[21] Appl. No.: 596,484

[22] Filed: Apr. 3, 1984

[51] Int. Cl.[4] ............................................. G06F 7/50
[52] U.S. Cl. ..................................... 364/745; 364/770
[58] Field of Search ............... 364/745, 770, 787, 786, 364/784

[56] References Cited

U.S. PATENT DOCUMENTS

| | | | |
|---|---|---|---|
| 3,549,872 | 12/1970 | McElreen | 364/770 |
| 3,906,212 | 9/1975 | Poguntke | 364/784 |
| 3,925,651 | 12/1975 | Miller | 364/787 |
| 3,989,940 | 11/1976 | Kihara | 364/770 |
| 4,041,474 | 8/1977 | Can | 364/770 |
| 4,215,418 | 7/1980 | Muramatsu | 364/784 |

OTHER PUBLICATIONS

Elliott, "Increment–Decrement Logic" *IBM Tech. Disclosure Bulletin*, vol. 11, No. 3, pp. 297–298, Aug. 1968.
"Parallel-Array Incrementing Network" *IBM Tech. Disclosure Bulletin*, vol. 27, No. 11, Apr. 1985, pp. 6450–6453.
"FET Dram Look–Ahead Address Incrementer" *IBM Tech. Disclosure Bulletin*, vol. 28, No. 1, Jun. 1985, pp. 71–73.

*Primary Examiner*—David H. Malzahn
*Attorney, Agent, or Firm*—Noel F. Heal

[57] ABSTRACT

A high-speed rounding circuit for producing a rounded binary number without using extensive and costly logical AND circuitry. The circuit includes a current-mode logic module in which multiple transistors have their emitter terminals selectively wired together to produce intermediate signals that are the logical OR of the inverted forms of bit position values from the unrounded number. The intermediate signals are then combined with the original unrounded bit position values in logical exclusive OR circuit modules, to produce the desired rounded bit position values in a parallel fashion, but without the need for extensive and costly circuitry.

6 Claims, 3 Drawing Figures

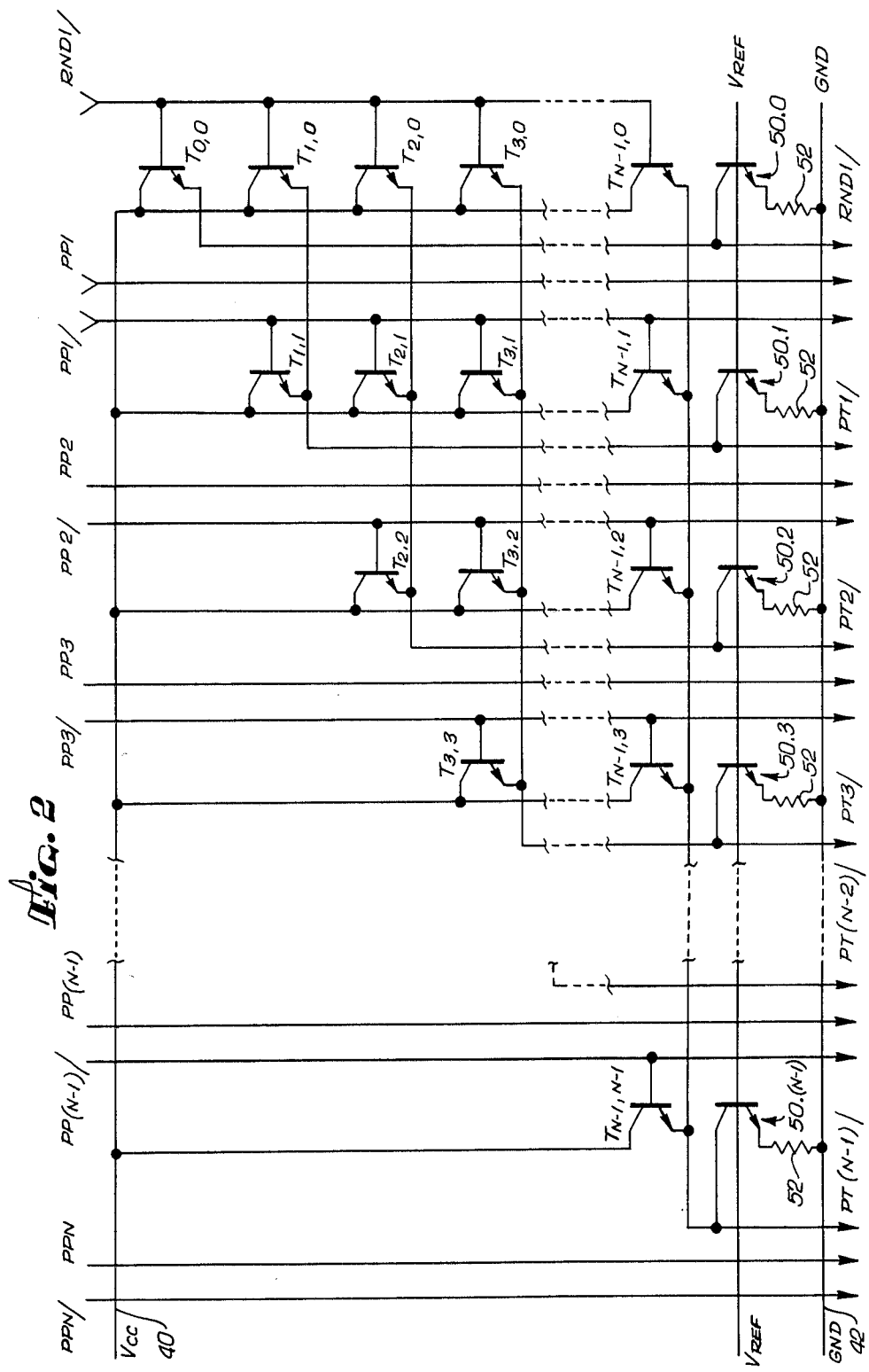

LOOK-AHEAD ROUNDING CIRCUIT

BACKGROUND OF THE INVENTION

This invention relates generally to digital circuitry for performing a rounding operation on a binary number. Rounding is often required in conjunction with an arithmetic operation, such as multiplication. For example, if an arithmetic operation is performed to a high degree of accuracy, perhaps producing a product of thirty-two binary digits or bits, it may be required to express this result in a form that is rounded to some lesser number of bits of accuracy.

Rounding may be performed by adding a "1" bit at a bit position one less in significance than the least significant bit position of the desired result. For example, if it was desired to obtain a seventeen-bit rounded binary product using bits 14–30 of an unrounded number, a "1" would be added at the thirteenth bit position. If there was an "0" at this position of the product, rounding would have no effect at all. However, if there was a "1" at bit position thirteen, this would cause a rounding bit to be carried into bit position fourteen. If there was also a "1" in this position, another carry would be generated, into bit position fifteen. So long as a "1" is present in a bit position of the unrounded number, and in all bit positions of lesser significance, the rounding operation will generate a carry into the next most significant bit position. When a "0" bit is encountered in the unrounded number, the rounding carry will produce a "1" at that position, and no further carry into the next bit position.

Rounding by this process requires the rounding carry, if any, to "ripple" across the number being rounded until the first zero is encountered. Although the process is simple, it requires much circuitry and a large number of gate delay times to execute, since the ripple process is a serial one. For high-speed operation, some form of look-ahead rounding process is more desirable, so that the separate bits of the rounded number can be computed in parallel rather than one after the other. In some types of circuitry, the rounding operation may be integrated with an associated arithmetic step, such as addition. However, in other types of circuitry, it may not be possible to perform rounding other than as a separate step following some other operation. In the latter case, parallel rounding can be performed by circuitry that includes a number of AND gates with multiple inputs. The result at any particular bit position is computed by first taking the logical AND of all the bits of lesser significance, including the rounding carry bit into the least significant bit position. If the result of the ANDing operation is a "1", then a "1" is added to the binary quantity at the current bit position, which will result in a complementing of the bit at that position. If the result of the ANDing operation is a "0", the current bit position will be unaffected by rounding.

Although this technique has the requisite parallelism and speed, it is very costly in terms of circuit complexity, and the area that the circuitry occupies on an integrated-circuit chip. Constructing AND gates with large numbers of inputs using conventional circuitry uses up a great deal of circuit chip "real estate" and renders the circuit much more costly.

It will be appreciated from the foregoing that there is still need for improvement in the field of rounding circuitry used in many arithmetic operations in integrated circuitry. In particular, the ideal rounding circuit should operate in a parallel or look-ahead fashion, but should not result in highly complex and costly circuitry. The present invention satisfies this need.

SUMMARY OF THE INVENTION

The present invention resides in a look-ahead rounding circuit employing current-mode-logic (CML) to greatly reduce the complexity of the circuitry, and provide a corresponding reduction in the manufacturing cost.

More specifically, the circuit of the invention, as configured to generate an n-bit rounded number from an m-bit unrounded number and a rounding carry input bit, comprises n groups of transistors arranged in logical columns, with the grouns having n, n−1, n−2, ... 2, and 1 transistors, respectively. The transistors in one group have their base terminals coupled together to receive inverse forms of the rounding carry bit, and the transistors of the other groups have their base terminals coupled together by group, to receive inverse forms of bits 1 through n of the unrounded number, respectively. In addition, the circuit includes means for coupling the emitter terminals of corresponding transistors of the n groups in logical rows, to connect with n respective current generators and to generate an intermediate signal at each bit position of interest, indicative of the logical AND of the rounding carry bit and all unrounded bits of lower significance than that of the bit position of interest. Finally, the circuit includes means at each bit position for generating a rounded bit value from the exclusive OR of the corresponding intermediate signal and the unrounded bit value.

By connecting the emitter terminals together, a logical OR operation is performed on the selected groups of inverse signals with little circuit complexity. By a well known logical identity, the logical OR of a set of inverse signals is equivalent to the inverse of the logical AND of the uninverted signals. Thus, the simple CML circuit structure employing coupled-emitter OR gates functions to perform the required ANDing of strings of bits in the unrounded number. An additional set of exclusive OR (XOR) circuits is all that is required to compute the rounded number from the unrounded one and the results of the ANDing operatons.

It will be appreciated from the foregoing that the present invention represents a significant advance over other techniques for performing a rounding operation. In particular, the invention provides a high-speed rounding operation without the complexity and cost usually associated with high-speed look-ahead rounding. Other aspects and advantages of the invention will become apparent from the following more detailed description, taken in conjunction with the accompanying drawings.

BRIEF DESCRIPTION OF THE DRAWINGS

FIG. 2 is a schematic diagram of seventeen-bit rounding circuit in accordance with the invention, some of the binary stages having been omitted for clarity.

DESCRIPTION OF THE PREFERRED EMBODIMENT

Figure 1:
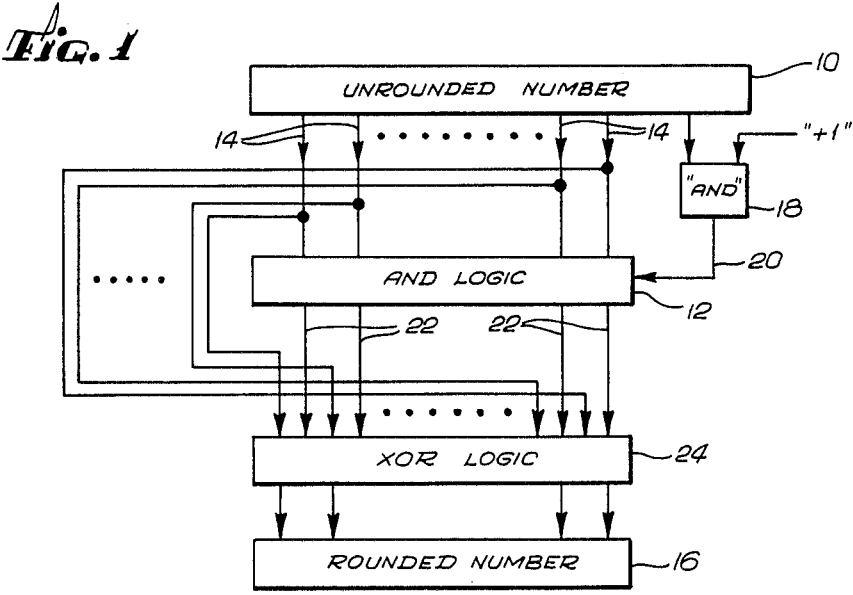
FIG. 1 is a block diagram that serves to explain the principles of the present invention.

As shown in the drawings for purposes of illustration, the present invention is concerned with circuitry for performing a rounding operation on a binary number. Rounding in binary arithmetic is performed by adding a binary "1" at a bit position one less in significance than the least-significant bit position of the desired rounded number. For example, if the least-significant bit position of the desired rounded number is fourteen, rounding can be prerformed by adding a "1" in the thirteenth bit position, where the bit positions are conventionally numbered from the least-significant to the most-significant. This approach to rounding causes a carry bit to ripple along the number being rounded until the first "0" bit is encountered.

For a faster generation of a rounded number, a parallel technique may be employed. A given bit position will change value as a result of rounding only if all the bits of lesser significance have a value of binary "1" and there is a "1" rounding carry bit at the least significant position. Thus it can be determined whether to change a bit value by ANDing together all the bits of lesser significance and the rounding carry bit at the least-significant bit position. This approach is shown diagrammatically in FIG. 1, where the unrounded number is indicated by reference numeral 10. The unrounded bits are introduced to AND logic 12, over lines 14. The bit of the unrounded number 10 that is one bit lesser in significance than the least-significant bit of the desired rounded number 16, is ANDed with a rounding control in an ANDing circuit 18. The result is a rounding carry bit, which is introduced into the AND logic 12 over line 20. The AND logic 12 produces intermediate signals on lines 22, and these are combined in XOR logic 24 with the original signals from the unrounded number 10, to produce the rounded number 16.

The logic equations involved are relatively simple to derive. The following nomenclature is used:

$RND1$ = the rounding carry signal on line 20 into the least-significant bit position of the rounded number;

$PPn$ = the nth bit of the unrounded number (where n has values from 1 to N, the number of bits in the rounded number);

$PTn$ = the AND logic output signal from the nth bit position (where n has values from 1 to N−1);

$PRn$ = the nth bit of the rounded number (where n has values from 1 to N).

The logic equations are as follows:

For n=1 through N−1:

$$PTn = AND(RND1, PP1, PP2, \ldots PPn). \quad (1)$$

For n=1:

$$PR1 = XOR(RND1, PP1). \quad (2)$$

For n=2 through N:

$$PRn = XOR(PPn, PT(n-1)) \quad (3)$$

The notation used in these equations is that the logical function specified is performed on the terms within the following parentheses. For example, equation (2) means that PR1 is obtained by taking the exclusive OR of RND1 and PP1.

These equations are simple enough to implement if the circuit may be designed without limitation on the number of components used. Equation (1) requires N−1 AND gates having, respectively, two inputs, three inputs, four inputs, and so forth up to N inputs for each gate. AND gate circuitry of this type takes up considerable space in an integrated circuit, and is therefore costly to fabricate.

In accordance with the present invention, the AND logic necessary for the fabrication of a look-ahead rounding circuit takes the form of current-mode logic (CML), and the logical AND function is performed as a logical OR with negative logic. In the illustrative embodiment of the invention, the logical OR function is performed as a "wired OR" in which the emitters of selected groups of transistors are coupled together.

As shown in FIG. 2, the AND logic includes a plurality of NPN transistors arranged in a matrix of rows and columns. For ease of reference, the rows are numbered from 0 through N−1 from top to bottom, and the columns are numbered from 0 through N−1 from right to left. The transistors are referred to by the letter T followed by two subscripts indicating the row number and column number, respectively. Thus, there are N−1 transistors in the first column (column #0) and they are designated $T_{0,0}$, $T_{1,0}$, and so forth to $T_{N-1,0}$. Column #1 has one fewer transistor than column #0, i.e. it has transistors $T_{1,1}$, $T_{2,1}$, and so forth to $T_{N-1,1}$. Similarly, column #2 has one fewer transistor than column #1, beginning with transistor $T_{2,2}$, and column #3 has one fewer than column #2, beginning with transistor $T_{3,3}$. This pattern continues to the (N−1)th column, which has only one transistor, $T_{N-1,N-1}$.

Figure 3:
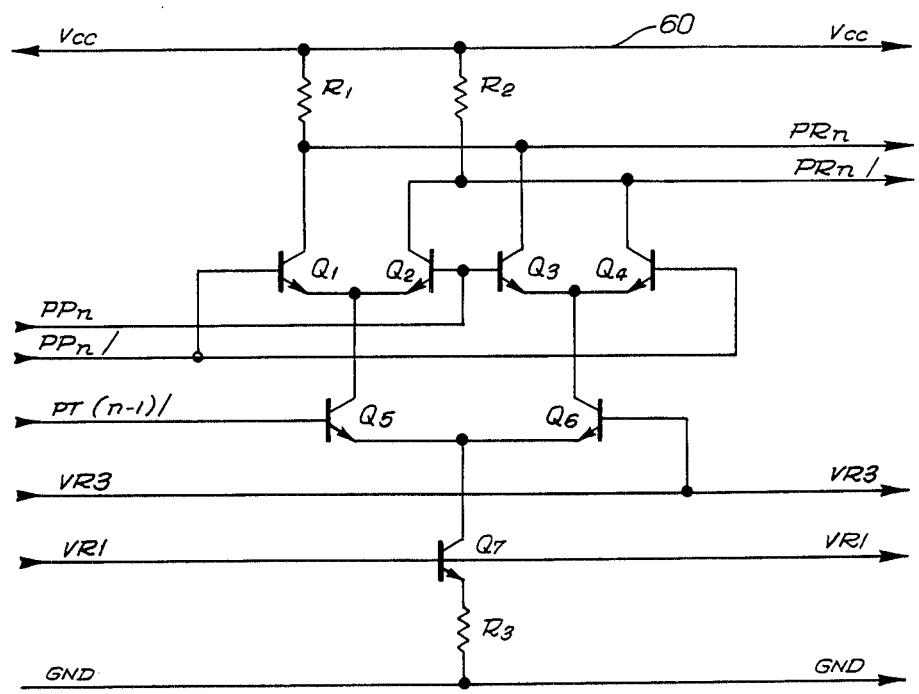
FIG. 3 is a schematic diagram of one stage of the exclusive OR logic employed in the circuit of the invention.

The logic is powered by a power supply line 40 and a ground line 42. Inputs to the logic include an inverse rounding carry signal, indicated at RND1/, where the "/" symbol represents a logical "not" or inversion of the designated signal. Other inputs include complementary pairs of signals from the unrounded number, designated PP1, PP1/, PP2, PP2/, and so forth up to PPN and PPN/. Only the inverse forms of these input signals are utilized in the AND logic of FIG. 2, and the uninverted forms of the input signals being passed through to be utilized in the XOR logic 24 (FIG. 1), which will be explained in more detail with reference to FIG. 3.

All of the transistors $T_{0,0}$ through $T_{N-1,N-1}$ have their collectors connected to the power supply line 40. Their base terminals are connected column by column to the respective input signals, and their emitters are connected row by row to provide the output signals. More specifically, the first column of transistors (column #0) has the base terminals of all its members connected to the inverse rounding carry input signal RND1/. The base terminal of the column #1 transistors $T_{1,1}$, $T_{2,1}$ and so forth are connected in common to the inverse input signal PP1/. The same pattern continues across the circuit, transistor $T_{N-1,N-1}$ having its base terminal connected to input signal PP(N−1).

Each of the rows of transistors generates an output signal that is subsequently used in conjunction with a bit position one greater than the row number. Row #0, which contains only transistor $T_{0,0}$, has its emitter coupled directly to an output line carrying the rounding carry signal RND1/, and this will be subsequently used, in the XOR logic, in conjunction with the bit #1 inputs PP1 and PP1/. The emitter of transistor $T_{0,0}$ is also coupled to the collector of a constantcurrent transistor 50.0, which is one of N such transistors, designated 50.0, 50.1, and so forth up to 50.(N−1). The base terminals of these transistors 50 are commonly connected to a reference voltage, and the emitters are connected to the ground line 42 through respective resistors 52. When current flows through transistor $T_{0,0}$ and transistor 50.0, the output signal line RND1/ goes to a relatively high voltage level, reflecting the RND1/ input signal applied to the base of the transistors in column #0.

The emitters of the transistors in row #1, i.e. transistors $T_{1,0}$ and $T_{1,1}$, are connected together to the collector of transistor 50.1 and to output signal line PT1. When either RND1/ or PP1/ goes high, at least one of the transistors $T_{1,0}$ and $T_{1,1}$ will be turned on and PT1/ will also go high. Therefore, PT1/ assumes a state given by RND1/+PP1/, where "+" indicates a logical OR operation. By a well known identity, if PT1/=RND1/+PP1/, PT1=RND1·PP1, where "·" indicates AND.

Transistor rows #2, #3, and so forth up to #(N−1) are connected in a similar manner to generate the output signals PT2/, PT3/, and so forth up to PT(N−1)/. For any particular output signal PTn/, the logic equation is:

PTn/=RND1/+PP1/+PP2/ ... +PPn/, or

PTn=RND1·PP1·PP2· ... ·PPn.

The signals PT1/ through PT(N−1)/ are then combined with the original signals from the unrounded number, in the XOR logic 24 (FIG. 1). This logic includes N exclusive OR modules of the type shown in FIG. 3, each of which includes seven NPN transistors designated Q1 through Q7. Transistors Q1 and Q2 are a complementary pair to the base terminals of which input signals PPn and PPn/ are connected. Transistors Q3 and Q4 are a similar complementary pair. Transistors Q1 and Q3 have their collectors coupled to a power supply line 60 through a resistor R1, and transistors Q2 and Q4 are coupled to the same power supply line through a second resistor R2. Input signal PPn is coupled to the base terminals of transistors Q2 and Q3, and input signal PPn/ is coupled to the base terminals of transistors Q1 and Q4.

Transistors Q5 and Q6 form a second level of a CML transistor stack. The emitters of transistors Q1 and Q2 are connected together to the collectors of transistor Q5, and the emitters of transistors Q3 and Q4 are connected together to the collector of transistor Q6. The emitters of transistors Q5 and Q6 are connected together to ground through transistor Q7 and resistor R3, which together define a current source. The base of transistor Q5 receives input signal PT(n−1)/ and the base of transistor Q6 is coupled to a voltage reference source designated VR3 in the drawing.

The complementary output signals from the module, PRn and PRn/, are derived from the collectors of transistor pairs Q1-Q3 and Q2-Q4, respectively. The outputs PRn, PRn/ are identical to the inputs PPn, PPn/ when input PT(n−1) is in one state, and are the inverse of PPn, PPn/ when PT(n−1) is in the other state. This is equivalent to the logical XOR function. For the first bit position the XOR function is performed on RND1 and PP1.

It will be appreciated from the foregoing that the present invention represents a significant advantage over rounding circuits of the prior art. In particular, the circuit of the invention uses current-mode logic to define the equivalent of a set of multiple-input AND gates that permit the generation of a set of intermediate rounding carry signals in parallel, but without extensive circuitry. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A look-ahead rounding circuit for generating an N-bit rounded number having bits numbered from 1 at the least significant end to N at the most significant end, from an N-bit unrounded number and a rounding carry input bit at the least-significant bit position, said circuit comprising:

a power supply;

a first group of N transistors arranged logically in a column, each transistor having a first terminal connected to said power supply, a base terminal connected to receive the rounding carry input bit in inverse form, and a third terminal to provide an indication of the rounding carry input bit in inverse form;

a second group of N−1 transistors each having a first terminal connected to said power supply, a base terminal connected to receive in input from bit #1 of the unrounded number in inverse form, and a third terminal to provide an indication of bit #1 of the unrounded number in inverse form;

a third group of N−2 transistors each having a first terminal connected to said power supply, a base terminal connected to receive in input from bit #2 of the unrounded number in inverse form, and a third terminal to provide an indication of bit #2 of the unrounded number in inverse form;

fourth through Nth additional groups of transistors having N−3, N−2, and so forth, transistors, respectively, the Nth group having only one transistor, and each of the transistors in the mth such group having one terminal connected to said power supply, a base terminal connected to receive a signal from the (m−1)th bit of the unrounded number in inverse form, and a third terminal to provide an indication of the inverse form of the (m−1)th bit of the unrounded number;

a plurality of (1 through N) of current generators;

first connecting means, for connecting the third terminal of one transistor in the first transistor group to ground through current generator #1, to provide a first intermediate signal in inverse form at bit position #1;

second connecting means, for connecting the third terminals of one transistor in each of the first and second groups together to ground through current generator #2, to provide a second intermediate signal in inverse form at bit position #2;

third through Nth connecting means to provide intermediate signals in inverse form at bit position #3 through #N, wherein the nth of such connecting means connects the third terminals of a set of transistors having one transistor in each of the groups from first through the nth, and connects these terminals to ground through the nth current generator; and means at each bit position for generating the exclusive OR of the corresponding intermediate signal in non-inverted form and the bit value from the unrounded number, to obtain the rounded number.

2. A look-ahead rounding circuit as set forth in claim 1, wherein:
said third terminals of said transistors are the emitter terminals; and
the intermediate signal at each bit position is the logical OR of a set of input signals in inverted form, which is equivalent to the inverse of the logical AND of the same input signals uninverted.

3. A look-ahead rounding circuit for generating an N-bit rounded number from an N-bit unrounded number and a rounding carry input bit, said circuit coomprising:
N groups of transistors arranged in logical columns, with the groups having N, N−1, N−2...2, and 1 transistors, respectively, wherein the transistors in each group have their base terminals coupled to receive signals indicative of the rounding carry bit and bits 1 through N−1 of the unrounded number, respectively;
a plurality N of current generators;
a plurality N of connecting means for coupling the emitter terminals of transistors of the N groups, wherein the nth of said connecting means connects the emitters of a set of transistors having one transistor in each of the groups 1 through n and connects these emitters to the nth of the current generators, to generate an intermediate signal at each bit position, indicative of the logical AND of the rounding carry bit and all unrounded bits of lower significance; and
means at each bit position for generating a rounded bit value as the exclusive OR of the corresponding intermediate signal and the unrounded bit value.

4. A look-ahead rounding circuit as set forth in claim 3, wherein:
said means at each bit position for generating a rounded bit value includes a current-mode-logic circuit module for receiving an intermediate signal and additional signals indicative of the unrounded bit value, and for computing the exclusive OR of the unrounded bit value and the intermediate signal.

5. A look-ahead rounding circuit for generating an N-bit rounded number from an N-bit unrounded number and a rounding carry bit, said circuit comprising:
current-mode logic means for generating an intermediate signal for each bit position n, indicative of the logical OR of the inverted forms of the rounding carry bit and of bit position values at all bit positions of lesser significance than n; and
exclusive OR circuit means for each bit position, for generating the rounded bit position value as the exclusive OR of the intermediate signal and the unrounded bit position value.

6. A look-ahead rounding circuit as set forth in claim 5, wherein said current-mode logic means includes:
N groups of transistors, the transistors having their collectors connected in common to a power supply, and the base terminals in each group connected in parallel to receive the inverse forms of the rounding carry bit, in one group, and the respective bit position values of bits 1 through N−1 of the unrounded number, in the other groups;
a plurality N of current generators;
means for connecting the emitter of one transistor of the first group to the first of the current generators, to provide a first intermediate signal indicative of the rounding carry bit; and
N−1 wired-OR connections between multiple transistors in said N groups, wherein the nth of said wired-OR connections connects the emitters of a set of transistors having one transistor in each of the groups 1 through n+1 and connects these emitters to the (n+1)th of the current generators, to provide the N−1 intermediate signals, the nth such intermediate signal being indicative of the logical OR of the inverted rounding carry bit and the inverted forms of the unrounded bit values at bit positions 1 through n−1.

* * * * *